US011298610B2

(12) United States Patent
Orion et al.

(10) Patent No.: US 11,298,610 B2
(45) Date of Patent: Apr. 12, 2022

(54) ADJUSTABLE TRIGGER-STOPS FOR VIDEOGAME CONTROLLERS

(71) Applicant: Performance Designed Products LLC, San Diego, CA (US)

(72) Inventors: Storm Orion, San Diego, CA (US); Trevor Thomas Lehr, Alpine, CA (US); Ali Homayounfar, San Diego, CA (US)

(73) Assignee: Performance Designed Products LLC, San Diego, CA (US)

(*) Notice: Subject to any disclaimer, the term of this patent is extended or adjusted under 35 U.S.C. 154(b) by 43 days.

(21) Appl. No.: 16/909,307

(22) Filed: Jun. 23, 2020

(65) Prior Publication Data
US 2021/0394047 A1 Dec. 23, 2021

(51) Int. Cl.
*A63F 13/24* (2014.01)

(52) U.S. Cl.
CPC .................... *A63F 13/24* (2014.09)

(58) Field of Classification Search
CPC .......... A63F 13/24; A63F 2300/1043
See application file for complete search history.

(56) References Cited

U.S. PATENT DOCUMENTS

| 10,159,896 | B2 | 12/2018 | Strahle et al. |
| 10,632,367 | B2 | 4/2020 | Strahle et al. |
| 2005/0085299 | A1 | 4/2005 | Murzanski et al. |
| 2010/0321899 | A1 | 12/2010 | Vossoughi et al. |
| 2013/0147610 | A1 | 6/2013 | Grant et al. |
| 2014/0094310 | A1* | 4/2014 | Bleich ............. A63F 13/24 463/38 |
| 2015/0084900 | A1 | 3/2015 | Hodges et al. |
| 2015/0283458 | A1 | 10/2015 | Burgess et al. |
| 2016/0351362 | A1* | 12/2016 | Tsai ............... A63F 13/24 |
| 2019/0056790 | A1 | 2/2019 | Grant et al. |
| 2020/0406128 | A1* | 12/2020 | Nakagawa ......... A44B 11/065 |

FOREIGN PATENT DOCUMENTS

| JP | 10118337 A | 5/1998 |
| JP | 10127945 A | 5/1998 |
| WO | WO 2005/120929 A1 | 12/2005 |

OTHER PUBLICATIONS

PCT International Serach Report and Written Opinion, regarding International Application No. PCT/US2021/023607, dated Jul. 12, 2021, 10 pages.

* cited by examiner

*Primary Examiner* — James S. McClellan
*Assistant Examiner* — Peter J Iannuzzi
(74) *Attorney, Agent, or Firm* — Knobbe, Martens, Olson & Bear LLP

(57) ABSTRACT

A video game controller has triggers that can be depressed by a user. The triggers have associated trigger stops actuatable to limit the travel of the trigger when depressed by the user. The trigger stop can be selectively operated by the user to vary the trigger stop location, and therefore the amount of travel of the trigger when depressed, between multiple (e.g., more than 2, more than 3, more than 4, 5, etc.) positions.

20 Claims, 11 Drawing Sheets

ADJUSTABLE TRIGGER-STOPS FOR VIDEOGAME CONTROLLERS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure relates generally to videogame controllers, and more particularly to trigger-stop mechanisms for videogame controllers.

Description of the Related Art

Modern videogame controllers have become more complex in order to play increasingly complex videogames. Controllers regularly include a variety of control inputs (e.g., thumbsticks, directional pads, paddles) that can be operated to activate different functions or maneuvers while playing a videogame. The controller communicates the inputs the player provides via the control inputs as electrical signals to a videogame console to effect an action in the videogame. The console interprets the electrical signals and effects the response in the videogame corresponding to the control inputs from the user. Videogames vary in complexity of play, and the speed of actuation of control inputs of the controller can affect a user's performance in certain videogames (e.g., racing games, shooting games).

SUMMARY

Accordingly, there is a need for an improved video game controller with adjustable control input actuation to vary the speed of actuation of the control input when playing a video game.

In accordance with one aspect of the disclosure, an improved video game controller is provided with adjustable trigger actuation to vary the speed of actuation of the trigger when playing a video game. The trigger can be adjustable between a plurality (e.g., more than two) positions, each providing a different travel span distance for the trigger between an undepressed condition and a fully depressed condition.

In accordance with one aspect of the disclosure, an improved video game controller is provided with one or more triggers configured to be depressed by a user. The one or more triggers can have associated trigger stops actuatable to limit the travel of the trigger when depressed by the user. The trigger stop can be selectively operated by the user to vary the trigger stop location, and therefore the amount of travel of the trigger when depressed, between multiple (e.g., more than 2, more than 3, more than 4, 5, etc.) positions.

In accordance with another aspect of the disclosure, a video game controller is provided. The video game controller comprises a housing and a trigger movably coupled to the housing, the trigger pivotable about a first axis along a travel path in a direction transverse to the first axis from an undepressed position to a fully depressed position. The video game controller also comprises a trigger stop assembly. The trigger stop assembly comprises a clutch lever rotatable about a second axis, the clutch lever having a tooth that protrudes relative to a surface of the clutch lever. The trigger stop assembly also comprises a plunger rotatable about a third axis and configured to define a travel limit of the trigger when the trigger is fully depressed and contacts at least a portion of the plunger. The plunger comprises a gear with a plurality of teeth spaced apart from each other and a clearance space between adjacent teeth configured to removably receive at least a portion of the tooth of the clutch lever therein. The travel limit of the trigger is adjustable between a plurality of travel limit positions by inserting the tooth of the clutch lever in the clearance space between different teeth of the gear.

In accordance with another aspect of the disclosure, a video game controller is provided. The video game controller comprises a housing and a trigger movably coupled to the housing, the trigger pivotable about a first axis along a travel path in a direction transverse to the first axis from an undepressed position to a fully depressed position. The video game controller also comprises a trigger stop assembly. The trigger stop assembly comprises a clutch lever rotatable about a second axis, a clutch actuator attached to the clutch lever and configured to at least partially extend through an opening in the housing. The trigger stop assembly also comprises a plunger rotatable about a third axis and configured to define a travel limit of the trigger when the trigger is fully depressed and contacts at least a portion of the plunger. The plunger comprises a plurality of surfaces configured to releasably engage at least a portion of the clutch lever. The travel limit of the trigger is adjustable between a plurality of travel limit positions by releasably engaging said at least a portion of the clutch lever with a different surface of the plurality of surface of the plunger. The clutch actuator is selectively actuatable by a user to disengage the clutch lever from the plunger to allow for the adjustment in the travel limit of the trigger, wherein actuation of the clutch lever causes the clutch lever to disengage from the plunger, and where release of the clutch lever causes the clutch lever to engage with the plunger in one of the plurality of travel limit positions.

In accordance with another aspect of the disclosure, a videogame controller is provided. The video game controller comprises a housing and a trigger movably coupled to the housing, the trigger pivotable about a first axis along a travel path in a direction transverse to the first axis from an undepressed position to a fully depressed position. The video game controller also comprises a trigger stop assembly. The trigger stop assembly comprises a clutch lever rotatable about a second axis, the clutch lever having a pawl. The trigger stop assembly also comprises a plunger rotatable about a third axis and configured to define a travel limit of the trigger when the trigger is fully depressed and contacts at least a portion of the plunger. The plunger comprises a stepped end with a plurality of stepped surfaces spaced apart from each other, each of the stepped surfaces configured to selectively engage at least a portion of the pawl of the clutch lever. The travel limit of the trigger is adjustable between a plurality of travel limit positions by engaging the pawl of the clutch lever with a different stepped surface of the plurality of stepped surfaces.

DETAILED DESCRIPTION

The present disclosure is directed toward adjustable trigger-stops and systems and methods for altering or enhancing videogame controller performance. A mechanical trigger-stop can be actuated via an actuator accessible to a user on the exterior of controller (e.g., moving a lever, a pin, a post, a slider, a knob, etc., touching a capacitive or other touch-sensitive switch, applying pressure to a squeeze switch, etc.). Adjusting a trigger-stop position can adjust a trigger-stop operating mode of the video game controller. For example, adjustment of the trigger-stop mechanism to one position can actuate a switching mechanism (e.g., a switch, relay, electronic signal, etc.) of the video game controller to effect a different mapping scheme/profile of electrical output signals communicated from the controller to the console from the mapping scheme/profile provided at a different position of the trigger-stop mechanism. Therefore, actuation of the trigger stop mechanism between different positions to alter the amount the trigger needs to be pulled before being stop (e.g., travel span distance between an undepressed condition to a fully depressed condition for the trigger), to afford quicker response times for the trigger during video game use, modifies the mapping scheme/profile of electrical signals generated by the controller and communicated to the video game console to activate the relevant functionality in the video game despite the different path along which the trigger may move on account of the trigger-stop position having been changed.

Figure 1:
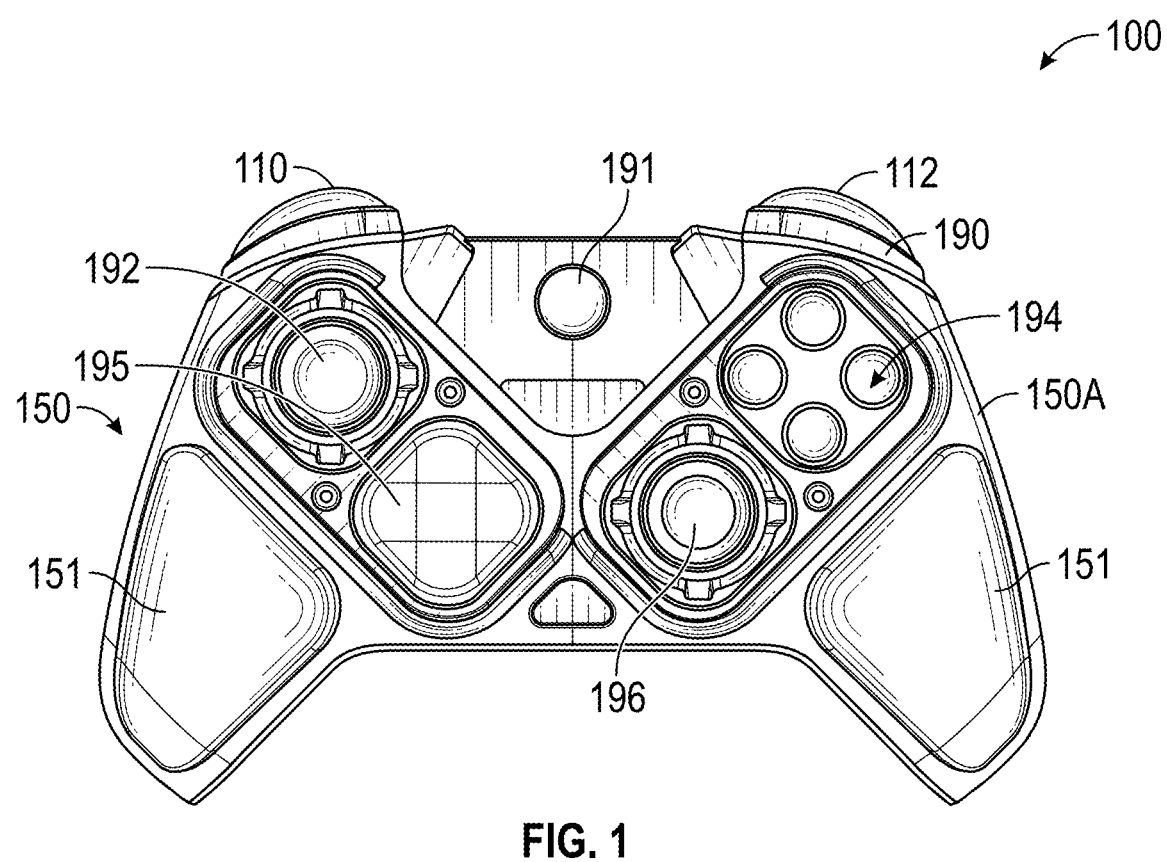
FIG. 1 illustrates a top view of a videogame controller.

FIG. 1 illustrates a top perspective view of a videogame controller 100 in which the smart trigger-stop mechanisms described herein can be implemented. The videogame controller 100 can include a housing 150 with handles 151 that may be held by a user. The videogame controller 100 can include one or more control inputs, such as one or more buttons (e.g., buttons 191, 194), one or more joysticks (e.g., joysticks 192, 196), one or more directional pads (e.g., directional pad 195), one or more bumpers (e.g., bumper 190) and one or more triggers (e.g., left trigger 110, right trigger 112) that may be exposed or accessible through a top and/or forward face of housing 150A and operated by a user with their fingers. FIG. 1 shows the triggers 110, 112 in an undepressed condition. One of more of these controls inputs (e.g., button(s), joystick(s), directional pad(s), and/or trigger(s)) can be operatively coupled (e.g., mechanically and/or electrically coupled) to one or more internal components housed within and carried by the housing 100.

The triggers 110, 112 can be mechanically coupled with the housing 150 via a hinge (e.g., a spring loaded hinge), and electrically coupled with an internal sensor that detects the movement of the triggers 110, 112 and generates or affects one or more signal(s) corresponding to such movements (or actuate a sequence of steps that results in such signal(s) being generated (e.g., via a transducer) or affected (e.g., by a variable resistor)). The trigger 110, 112 can be depressed or otherwise displaced to a certain degree/distance when pressed by a user, and then may spring back (e.g., via a spring loaded hinge) to its resting position (e.g., undepressed condition) when released. The path along which the trigger 110, 112 (or a portion of trigger 110) moves when pressed by a user (e.g., between an undepressed condition and a fully depressed condition) is referred to herein as the "travel path" or "path of travel" and the distance of the travel path is referred to herein as the maximum travel span or maximum travel distance.

Figure 3B:
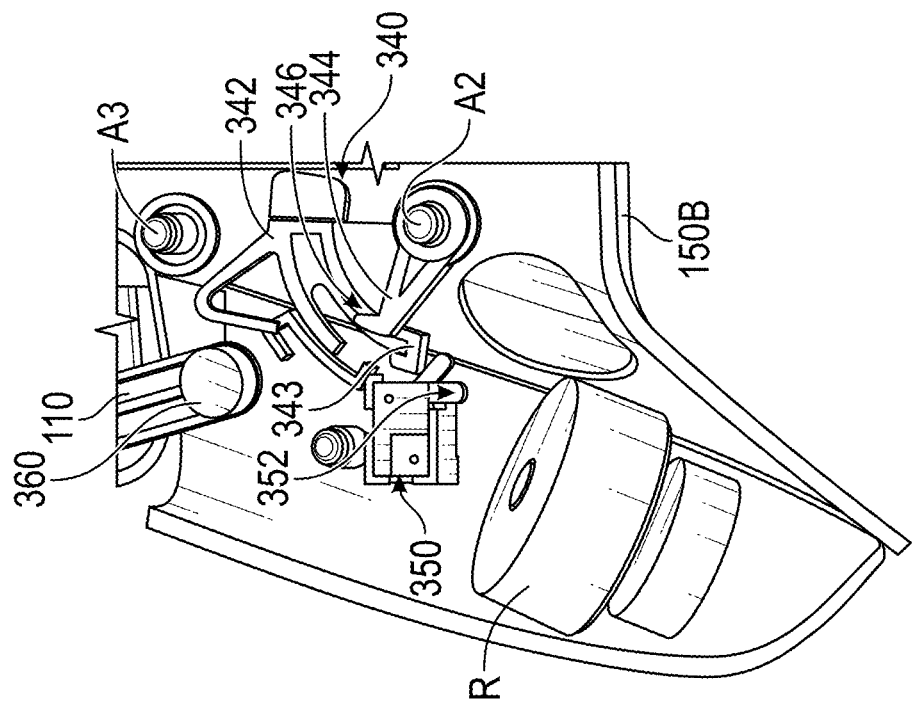
FIG. 3B illustrates a partially disassembled top view of the video game controller of FIG. 1 without the top case of the video game controller to show the trigger assembly in FIG. 3A.
Figure 3A:
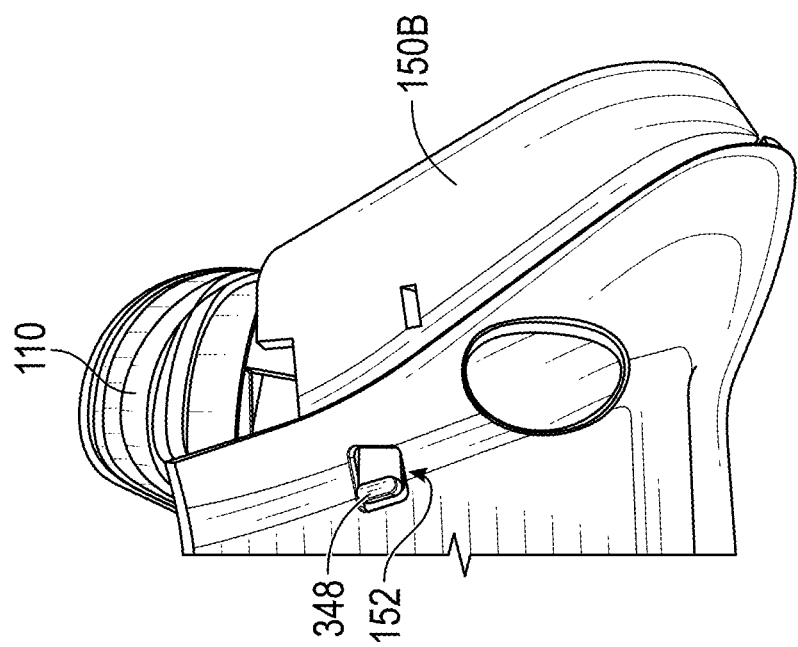
FIG. 3A illustrates a partial bottom view of the video game controller of FIG. 1, showing one trigger and trigger stop actuator.

The controller design defines the maximum travel distance the trigger 110, 112 can be depressed or otherwise moved along the travel path before being stopped or blocked by another structure (e.g., blocked by a portion of the housing, or a structure coupled with the housing such as a guide component). As further discussed below, the videogame controller 100 can have a trigger-stop mechanism that operable to "stop" the movement of trigger 110, 112 at more than one location to vary the maximum travel distance of the trigger 110, 112. The trigger-stop mechanism can be actuated via an actuator 348 (see FIG. 3A) operatively coupled thereto that is accessible to a user from outside of the controller housing (e.g., via an opening 152 in the bottom face 150B of the housing 150). The actuator 348 can be a slider that is moved outwardly toward an outer lateral edge of the controller 100. However, the actuator 348 can have other suitable form factors, such as a lever, a pin, a post, a knob, etc.

Figure 2:
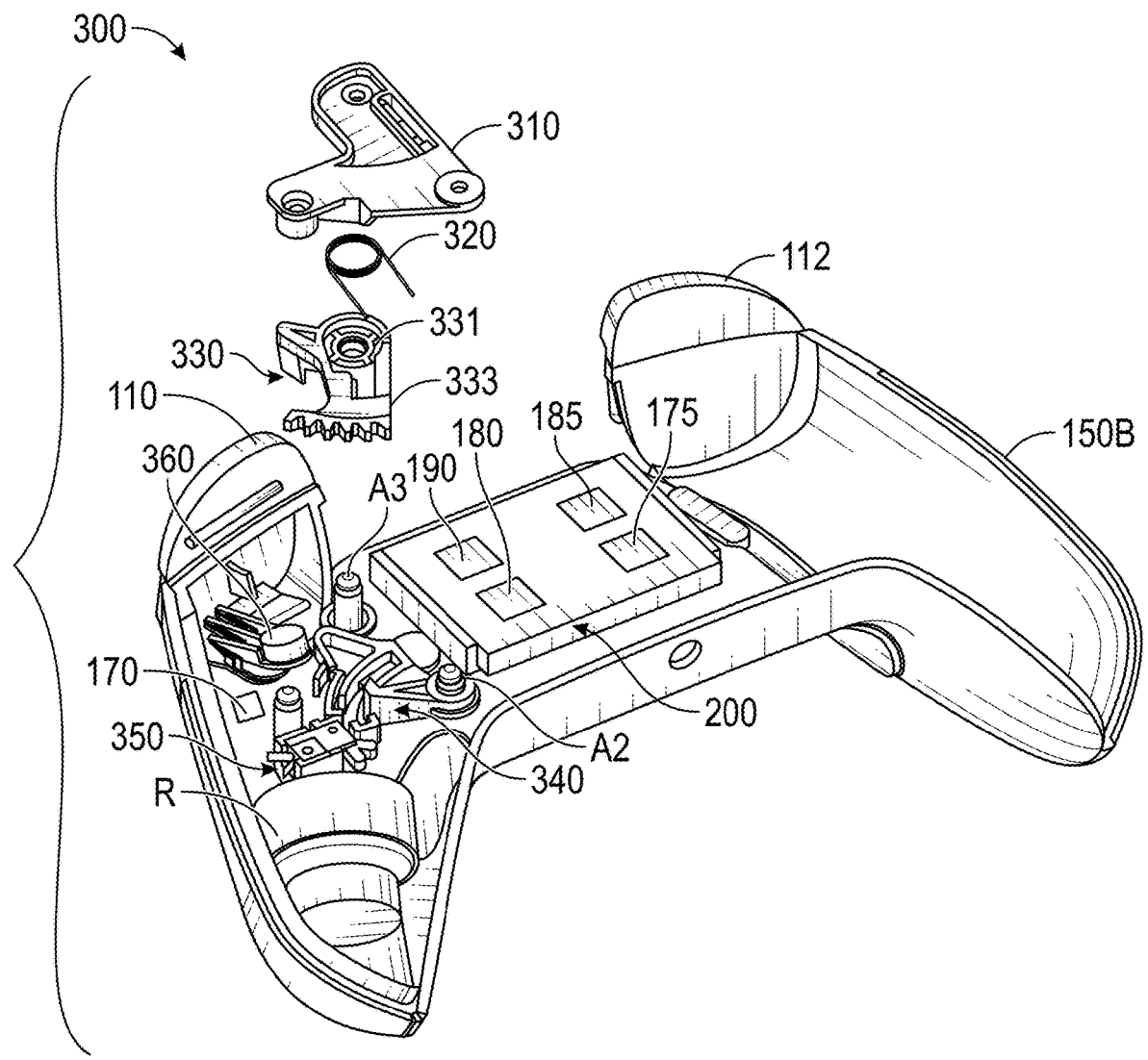
FIG. 2 illustrates a partially exploded view of the video game controller with a top case of the controller excluded and showing the components of one trigger assembly.

FIG. 2 shows a partial view of the controller 100 with the top face 150A of the housing 150 removed. The controller 100 can include electronics 200 and optionally include a rumble or vibration motor R for providing haptic feedback to the controller 100. The controller 100 can also include an electrical switch 350 (e.g., a mini-detector micro switch). The electronics 200 can include a processor 175, a memory 180, a transmitter 185, and/or a power source 190, which can be mechanically and/or electrically coupled with one another and/or with the housing 150, and can operate alone or together to facilitate one or more implementations of the trigger-stop technology disclosed herein. For simplicity, various electrical components of the electronics 200 illustrated are depicted symbolically using boxes (e.g., the processor 175, memory 180, etc.).

Figure 2A:
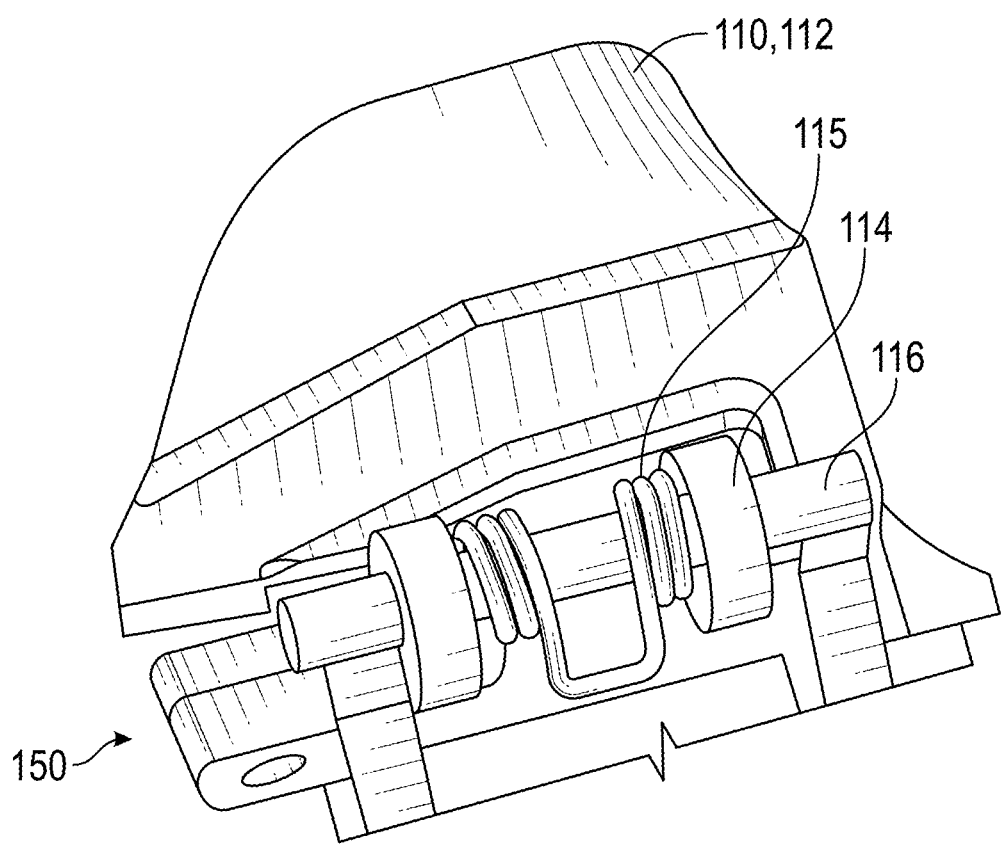
FIG. 2A illustrates a partial view of a trigger of the videogame controller.

Various components of the controller 100 are excluded from FIG. 2 to better illustrate a trigger-stop assembly 300 associated with the trigger 110. As best shown in FIG. 2A, the trigger 110 can be rotatably coupled to the housing 150 via a spring-loaded hinge assembly. The spring-loaded hinge assembly can include a pin 116 and barrel 114 configuration, with a resilient or compliant member 115 (e.g., a spring, such as a torsion spring) applying a force between housing 150 and trigger 110 that imposes a resistance to trigger depressions. Though not specifically depicted, spring-loaded hinge assembly can include another barrel or sleeve member that is coupled to the housing 150 and which holds the pin 116 in place relative to the housing 150. The barrel or sleeve member of the housing 150 and barrel 114 of trigger 110 may be fitted together to create a common channel through which pin 116 can be disposed. The spring-loaded hinge mechanism allows the trigger 110 to be depressed at least partially into the housing when pulled or pressed by a user (e.g., by a user's finger pressing on the trigger surface to depress the trigger 110), and then return to its original position when not being pressed or pulled by the user (e.g., by the force imposed by spring 115). A magnet 360 can be attached directly to or operatively attached to the trigger 110, for operation of a Hall effect sensor 170 that communicates with the electronics 200 (e.g., the processor or MCU or microcontroller 175), as further described below. Though not shown, one of skill in the art will recognize that the trigger-stop assembly 300 can also be implemented in the housing 150 to engage with the trigger 112, and that the trigger 112 can also have a spring-loaded hinge mechanism as shown in FIG. 2A.

Figure 8:
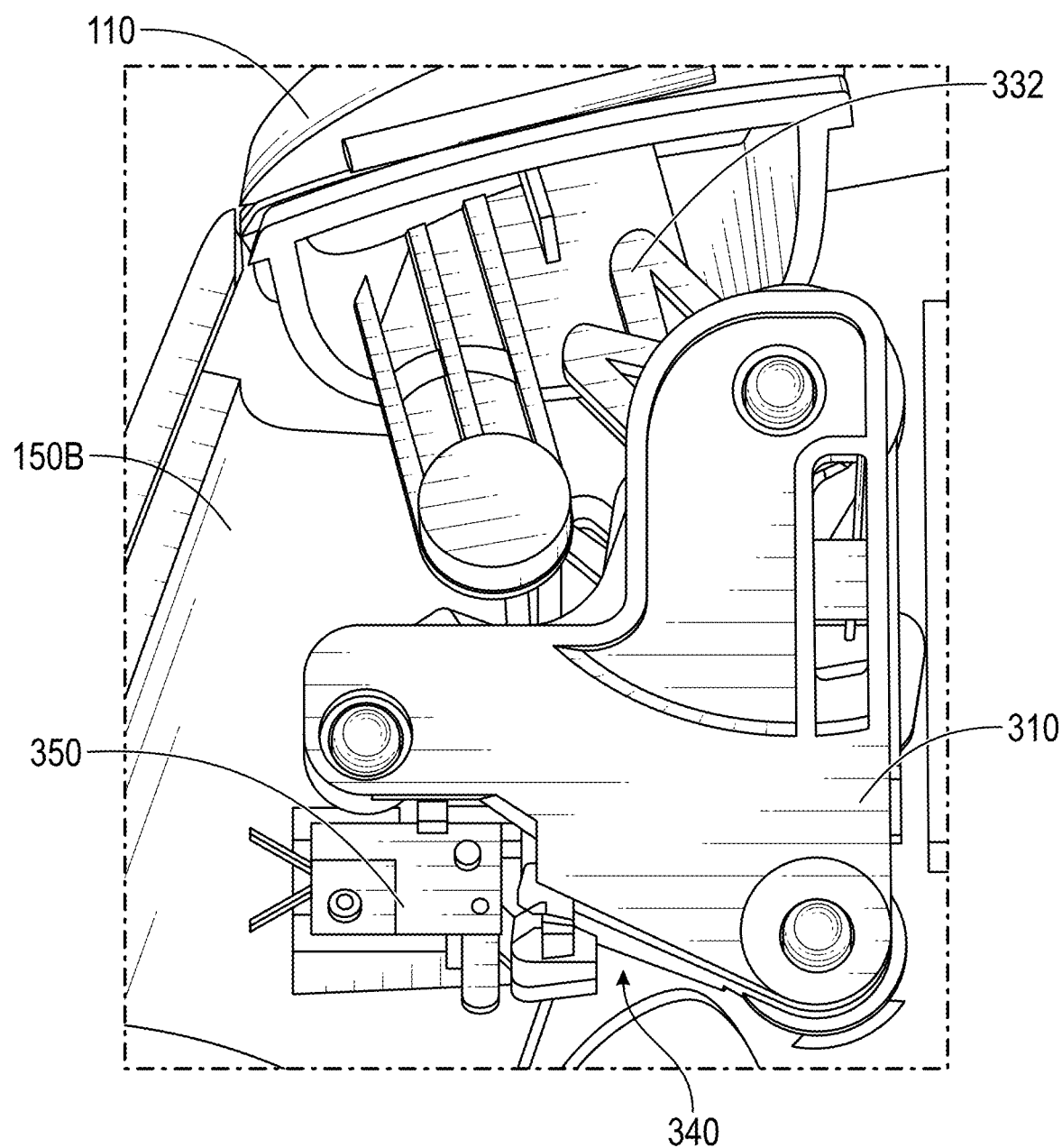
FIG. 8 illustrates a top view of a portion of the video game controller without the top case to show the trigger stop assembly.

With continued reference to FIG. 2, the trigger-stop assembly 300 includes a clutch 340 rotatably mounted on an axle or peg A2 that extends from an inner surface of a bottom face 150B of the housing 150. The trigger-stop assembly 300 also includes a plunger 330 rotatably mounted on an axle or peg A3 that extends from an inner surface of the bottom face 150B of the housing 150. The axle or peg A3 can be spaced apart from the axle or peg A2 and optionally extend generally parallel to each other. A resilient or compliant member (e.g., a spring, such as a torsion spring) 320 can couple to the plunger 330 and operatively couple to the housing 150 (e.g., to the bottom face 150B of the housing 150), so that the plunger 330 is spring-loaded relative to the housing 150 and biased toward a default position (e.g., a hair trigger position) as discussed further below. Optionally, a cover 310 can cover the plunger 330, as also shown in FIG. 8.

FIGS. 3A-7 show the operation of the trigger-stop assembly 300. The actuator 348 is attached to the clutch 340, so that actuation of the actuator 348 (e.g., movement or sliding of the slider 348 in the opening 152 of the housing 150) causes the clutch 340 to move (e.g., to rotate about the axle or peg A2). The clutch 340 includes a sliding structure 342 with a distal end 343 that engages the switch 350 (e.g., engages a lever 352 of the switch 350, such as a mini detector micro-switch). The clutch 340 also includes a clutch lever 344 that extents to a tooth 346. The tooth 346 can extend at an angle relative to (e.g., can extend generally transverse to, such as generally perpendicular to) the clutch lever 344. In one implementation, the clutch 340 is a single piece (e.g., monolithic, seamless piece), and can be molded as a single piece. In another implementation, one or more of the sliding structure 342, clutch lever 344 and actuator 348 can be separate components that couple to each other when assembled together. Optionally, the clutch 340 (e.g. the clutch lever 344) is spring-loaded (e.g., with a torsion spring between the clutch lever 344 and the housing 150) so that it is biased toward engagement with the plunger 330 (e.g., engagement with a gear of the plunger 330, as described below).

The plunger 330 has an elongated body 333 with an opening 331 via which it can be mounted to the axle or peg A3. The plunger 330 also has a lever 332 that protrudes from a side of the elongated body 333. The lever 332 extends at an angle (e.g., at an acute angle) relative to an axis of the elongated body 333 and faces toward the trigger 110, 112 when the plunger 330 is coupled to the housing 150. The lever 332 engages (e.g., contacts) at least a portion of the trigger 110, 112 when the trigger 110, 112 is pressed to limit the travel distance of the trigger 110, 112 and inhibit (e.g., prevent) the trigger 110, 112 from being pressed further. Accordingly, the lever 332 provides a stop for the trigger 110, 112 and defined the maximum travel distance for the trigger 110, 112. The maximum travel distance of the trigger 110, 112 will vary based on the position of the lever 332, which varies based on the angular orientation of the clutch 340 on the axle or peg A2, as discussed further below.

The plunger 330 also includes a gear 334 with a plurality of spaced apart teeth 336. The gear 334 can be curved (e.g., have a circular shape). In one implementation, the gear 334 is at an opposite end of the plunger 330 from the opening 331. In one implementation, the gear 334 is at an opposite end of the plunger 330 from the lever 332. Each pair of adjacent teeth 336 defining a clearance space 338 therebetween that is sized to removably receive the tooth 346 of the clutch lever 344. In one implementation, the gear 334 has six teeth defining five clearance spaces 338. However, the gear 334 can have fewer or more teeth than shown in FIGS. 2-7. In one implementation, the plunger 330 is a single piece (e.g., monolithic, seamless piece), and can be molded as a single piece. In another implementation, one or more of the elongated body 333, lever 332 and gear 334 can be separate components that couple to each other when assembled together.

Figure 5:
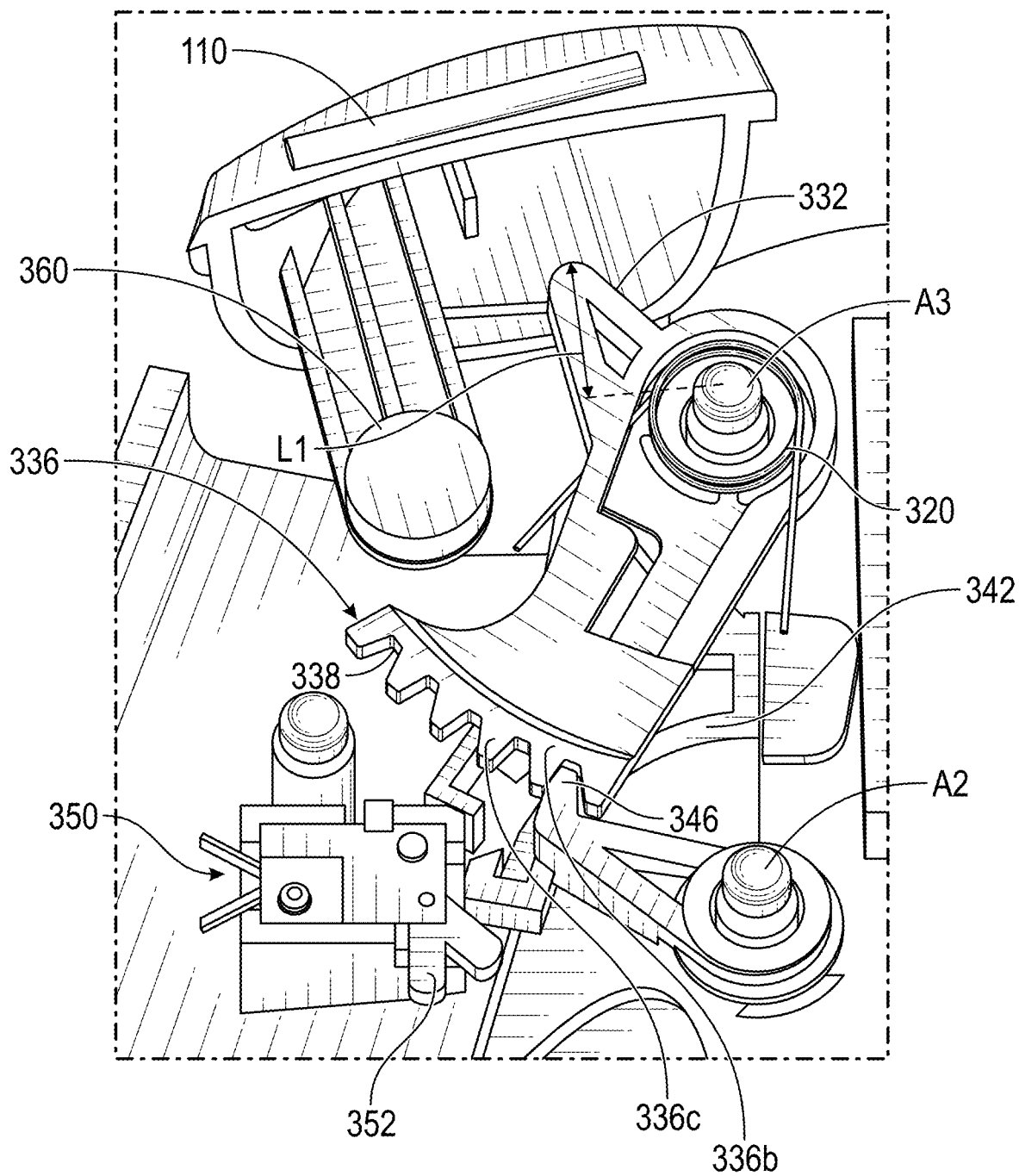
FIG. 5 illustrates an enlarged view of the trigger assembly of FIG. 3C with the trigger stop in one engaged position.
Figure 6:
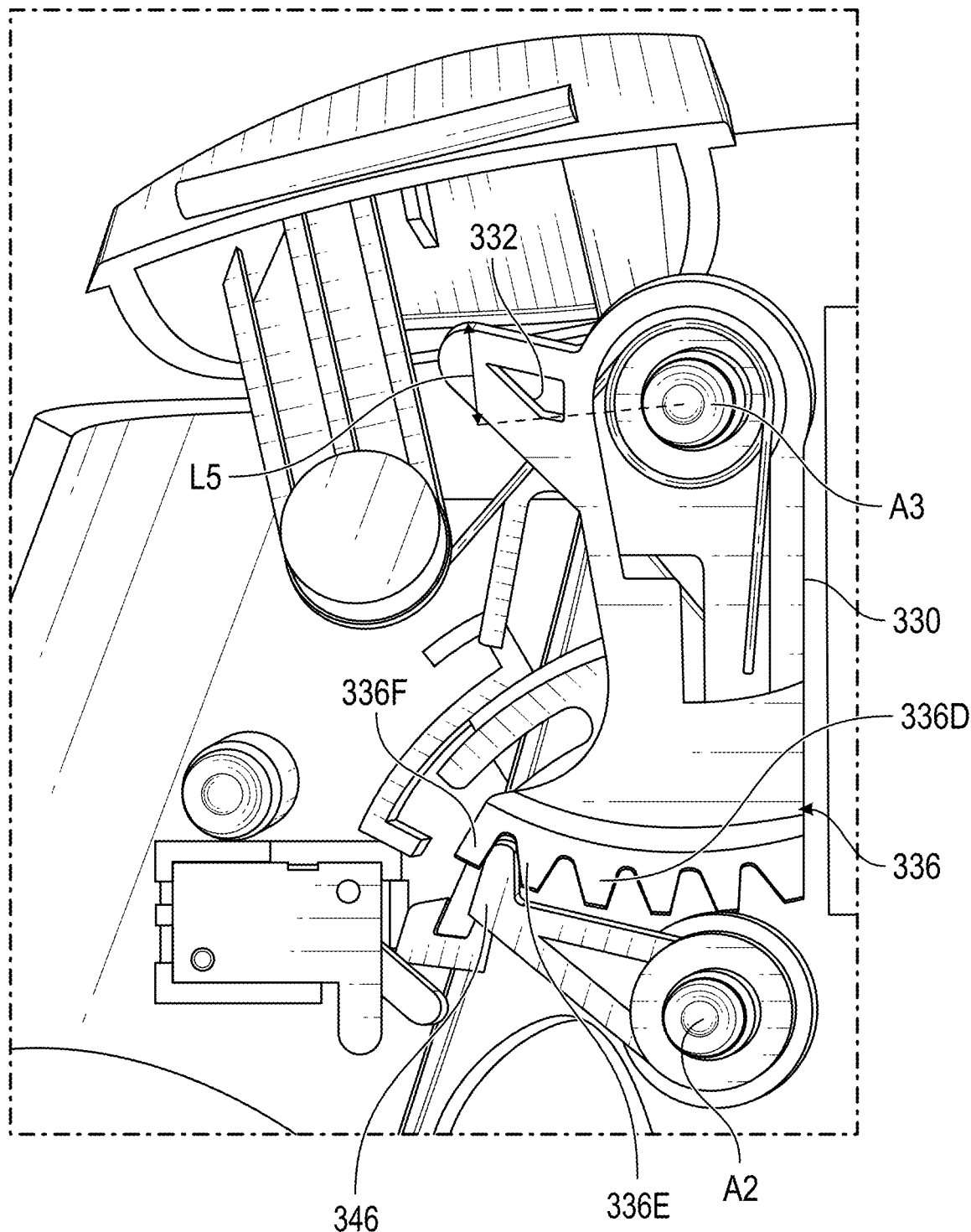
FIG. 6 illustrates an enlarged view of the trigger assembly of FIG. 3C with the trigger stop in another engaged position.
Figure 7:
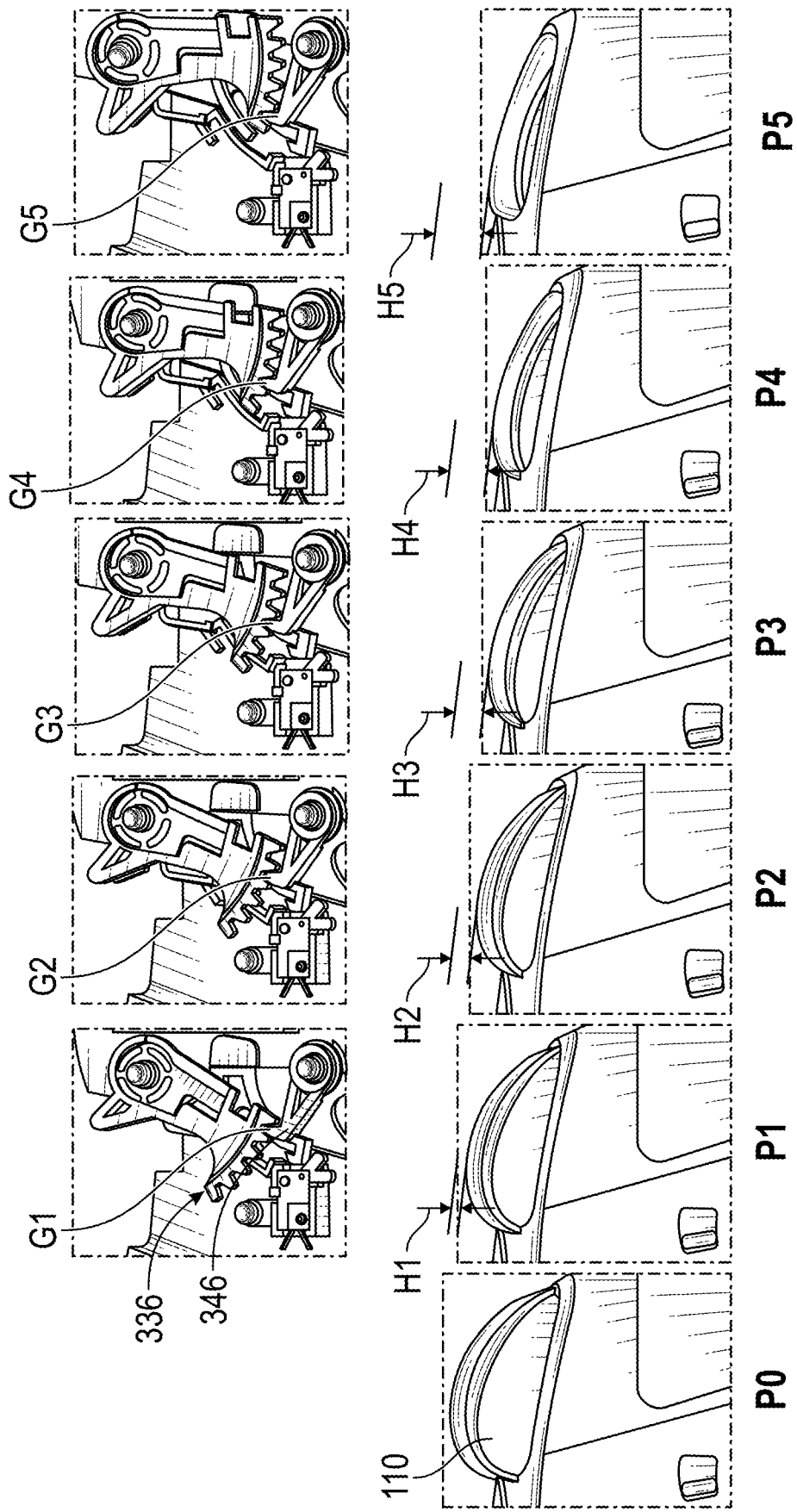
FIG. 7 illustrates top views of a portion of the trigger stop assembly in different engaged positions and corresponding bottom views of a portion of the video game controller showing the travel span of the trigger for each of the different engaged positions of the trigger stop assembly.

In operation, when the tooth 346 of the clutch lever 344 is engaged (e.g., frictionally engaged) with the gear 344 of the plunger 330 (e.g., the tooth 346 extends into the clearance space 338 between two teeth 346 of the gear 334), the trigger-stop mechanism 300 is in an engaged position and the lever 332 defines a stop for the trigger 110, 112 when it is pressed (e.g., the lever 332 contacts the trigger 110, 112 when the trigger 110, 112 is pressed) to define the maximum travel distance of the trigger 110, 112. FIGS. 5-7 show different engaged positions for the trigger-stop mechanism 300, as further discussed below. In another implementation, the gear 334 and tooth 346 of the clutch lever 344 can instead be a stepped surface and a pawl, respectively, for example in a ratchet type assembly, that engage (e.g., pawl selectively engages a step in a plurality of steps of the stepped surface) to set the maximum travel distance of the trigger 110, 112.

Figure 4:
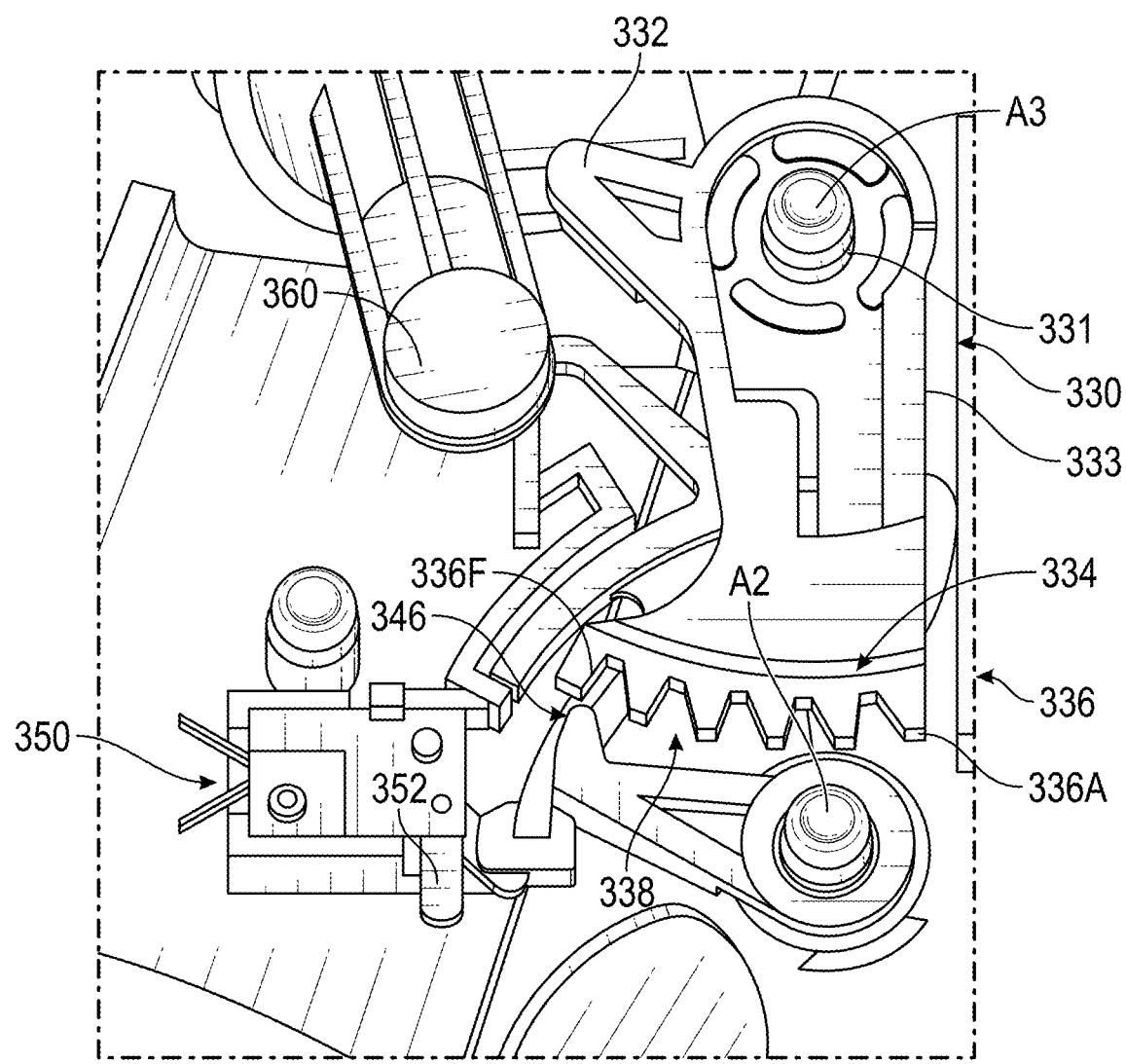
FIG. 4 illustrates an enlarged top view of a portion of the video game controller without the top case of the video game controller to show the trigger assembly of FIG. 3B in a disengaged position.

FIG. 4 shows a disengaged position for the trigger-stop mechanism 300. When the tooth 346 of the clutch lever 344 is disengaged from the gear 344 (e.g., the tooth 346 is outside of the clearance space 338 between two teeth 336 so that the tooth 346 is spaced apart from the gear 334), the trigger-stop mechanism 300 is in a disengaged position and the trigger stop position can be selectively changed by the user to another trigger stop position by engaging the tooth 346 of the clutch lever 344 with another clearance space 338 between another pair of teeth 336 of the gear 334. The clutch lever 344 is disengaged from the gear 334 (to disengage the clutch 340 from the plunger 330) via actuation of the actuator (e.g., slider, peg, lever, post) 348 by the user (e.g., sliding the slider 348 within the opening 152 in the housing 150 toward an outer lateral edge of the controller 100), which rotates the sliding structure 342 and the clutch lever 344 away from the plunger 330 such that the tooth 346 exits the clearance space 338 and disengages from the gear 334.

With the actuator (slider) 348 in this position, the user can press (push) the trigger 110, 112 to the desired trigger-stop location and then release the actuator (slider) 348, at which point the clutch lever 344 reengaged with the gear 334 (e.g., the tooth 346 of the clutch lever 344 extends into the clearance space 338 between the pair of teeth 336) at that location.

Advantageously, as the clutch lever 344 disengages from the gear 334, the distal end 343 of the clutch 340 engages the switch 350 (e.g., engages the lever 352 of the switch 350), which communicates a signal to the electronics 200 that the clutch 340 has been actuated, and the electronics 200 (e.g., microcontroller or MCU or processor 175) deactivate the trigger 110, 112 associated with the clutch 340 to that the signal generated or affected when the trigger 110, 112 is pressed is not communicated to the console when the clutch 340 is actuated (e.g., when the actuator or slider 348 is moved by the user to disengage the clutch lever 344 from the gear 334). In one implementation, the MCU or processor 175 can record a position of the trigger 110 when the actuator (e.g., slider) 338 is pressed, and wait to communicate the electrical signal corresponding to the position of the trigger 110 until the actuator (e.g., slider) 338 is released and the clutch lever 344 is reengaged with the gear 334 to define the trigger-stop position.

Once the clutch lever 344 is reengaged with the gear 334 (e.g., once the tooth 346 protrudes into the clearance space 338 and engages the teeth 336 of the gear 334), the switch 350 is deactivated (e.g., the distal end 343 of the sliding structure 342 disengages the lever 352 of the switch 350), and the electronics 200 (e.g., microcontroller or MCU or processor 175) reactivate the trigger 110, 112 associated with the clutch 340 to that the signal generated or affected when the trigger 110, 112 is pressed is communicated to the console when the clutch 340 is not actuated (e.g., when the actuator or slider 348 is not actuated by the user so that the sliding structure 342 is not moved). The electronics 200 (e.g., microcontroller or MCU or processor 175) can detect the trigger-stop position (e.g., based on the position of the switch 350) once the clutch 340 is released (e.g., when the actuator or slider 348 is released) and record the trigger-stop position as the maximum travel for the trigger 110, 112 and map the dynamic signal range to the new travel distance of the trigger 110, 112, so that the maximum dynamic signal provided by the controller 100 to the console corresponds to the trigger-stop position for the trigger 110, 112.

As discussed above, FIGS. 5 and 6 show the clutch lever 344 engaged with the gear 334 in a first and a last position, respectively, and define two different trigger-stop positions for the trigger-stop mechanism 300. FIG. 5 shows the tooth 346 of the clutch lever 344 extending into the clearance space 338 adjacent a first tooth 336A and engaged with (e.g., frictionally engaged with) the first tooth 336A and adjacent second tooth 336B. As the lever 332 is angled relative to the elongated body 333 of the plunger 330, in this first position, a distance L1 between the end of the lever 332 and the center of the opening 331 defines a length of the lever 332 relative to the opening 331. FIG. 6 shows the tooth 346 of the clutch lever 344 extending into the clearance space 338 adjacent a last tooth 336F and engaged with (e.g., frictionally engaged with) the last tooth 336F and adjacent fifth tooth 336E. As the lever 332 is angled relative to the elongated body 333 of the plunger 330, in this last position, a distance L5 between the end of the lever 332 and the center of the opening 331 defines a length of the lever 332 relative to the opening 331.

As can be seen from comparing FIGS. 5 and 6, the distance L5 is shorter than the distance L1, so that the maximum travel distance of the trigger 110, 112 is greater with the clutch lever 344 engaged with the gear 334 in the last position (in FIG. 6) with distance L5 than the first position (in FIG. 5) with distance L1 (e.g., the shorter the length of a distance between the end of the lever 332 and the opening 331, the greater the maximum travel distance of the trigger 110, 112). Moreover, engagement of the tooth 346 of the clutch lever 344 between two teeth 336 of the gear 334 at other positions of the gear between the first and last position, result in a distance L between the end of the lever 332 and the center of the opening 331 that is between the distance L1 and distance L5, resulting in a maximum travel distance of the trigger 110, 112 that is between the maximum travel distance with the clutch lever 344 in the first position and the last position of the gear 334.

FIG. 7 shows the trigger 110 in an undepressed position P0, as well as the trigger 110 with five different trigger-stop positions P1, P2, P3, P4, and P5 that coincide with five positions G1, G2, G3, G4 and G5, respectively of the clutch lever 344 of the clutch 340 relative to the gear 334 of the plunger 330. The first position G1 is the same as shown in FIG. 5, where the tooth 346 of the clutch lever 344 extends into the clearance space 338 between and engages the first tooth 336A and second tooth 336B. The first position G1 provides a first maximum travel distance H1. In one implementation, the first maximum travel distance H1 is between about 2 mm and about 3 mm (e.g., about 2.5 mm) and allows for the trigger 110 to be rotated about the axis of its hinge between about 3 degrees and about 8 degrees (e.g., about 5 degrees). The first position G1 provides a minimum travel for the trigger 110 and provides a "hair" trigger position, where the trigger 110 does not need to travel far when pressed by a user to generate the same maximum electrical signal as when the trigger-stop is in a different position. The "hair" trigger position can advantageously allow the user to provide inputs in a videogame (e.g., shots in a shooting game) more quickly, which can lead to an improved gaming performance and experience for the user.

Advantageously, the user can effect the "hair" trigger position of the trigger-stop mechanism 300 by pressing quickly on the actuator (e.g., slider, post, lever) 338 and then releasing it without pressing the trigger 110. This allows the clutch lever 344 to disengage the gear 334 and the plunger 330 to rotate (clockwise in FIG. 7, under spring force from the spring 320 that biases the plunger 330 toward the hair trigger position) so that the tooth 346 of the clutch lever 344 is aligned with the clearance space 338 between the first and second teeth 346A, 346B. When the actuator 338 is released the tooth 346 of the clutch lever 344 engages the gear 334 in the first position G1 (e.g., the tooth 346 extends into the clearance space 338 between the first and second teeth 336A, 336B).

In the second position G2, the tooth 346 of the clutch lever 344 extends into the clearance space 338 between and engages the second tooth 336B and third tooth 336C. The second position G2 provides a second maximum travel distance H2. In one implementation, the second maximum travel distance H2 is between about 3 mm and about 5 mm (e.g., about 4 mm) and allows for the trigger 110 to be rotated about the axis of its hinge between about 5 degrees and about 10 degrees (e.g., about 9 degrees).

In the third position G3, the tooth 346 of the clutch lever 344 extends into the clearance space 338 between and engages the third tooth 336C and fourth tooth 336D. The third position G3 provides a third maximum travel distance H3. In one implementation, the third maximum travel distance H3 is between about 4 mm and about 7 mm (e.g., about 6 mm) and allows for the trigger 110 to be rotated about the axis of its hinge between about 10 degrees and about 14 degrees (e.g., about 12.5 degrees).

In the fourth position G4, the tooth 346 of the clutch lever 344 extends into the clearance space 338 between and engages the fourth tooth 336D and fifth tooth 336E. The fourth position G4 provides a fourth maximum travel distance H4. In one implementation, the fourth maximum travel distance H4 is between about 6 mm and about 9 mm (e.g., about 8 mm) and allows for the trigger 110 to be rotated about the axis of its hinge between about 13 degrees and about 18 degrees (e.g., about 16 degrees).

In the fifth position G5, the tooth 346 of the clutch lever 344 extends into the clearance space 338 between and engages the fifth tooth 336E and sixth tooth 336F. The fifth position G5 is the same as the last position shown in FIG. 6 and provides a fifth maximum travel distance H5. In one implementation, the fifth maximum travel distance H5 is between about 8 mm and about 11 mm (e.g., about 9.5 mm) and allows for the trigger 110 to be rotated about the axis of its hinge between about 18 degrees and about 22 degrees (e.g., about 20 degrees).

With continued reference to FIG. 7, position G1 provides the minimum travel distance for the trigger 110 and position G5 provides the maximum travel distance for the trigger 110, with positions G2, G3, and G4 providing travel distances for the trigger 110 between the minimum travel distance of position G1 and the maximum travel distance of position G5. In one implementation, the first position G1 (the "hair" trigger position) has a travel span of between 5-25% of the travel span of the fifth position G5. Though FIG. 7 shows the trigger-stop mechanism 300 with five positions G1-G5, one of skill in the art will recognize that the trigger-stop mechanism 300 can have fewer (e.g., three, four) positions or more (e.g., seven, eight, nine, ten) positions. For example, the gear 332 can have more teeth 336 than shown in the drawings to provide such additional positions when the clutch lever 344 engages the gear 334.

As discussed above, the electronics 200 (e.g., processor 175) can impose a signal mapping scheme/profile that is different for each trigger-stop position. Advantageously, when the trigger 110, 112 is fully pressed in each trigger-stop position, the dynamic signal communicated by the controller 100 to the console is 100% of the possible output signal. The mapping scheme/profile can be a linear mapping profile. As the trigger 110, 112 is gradually pulled from its resting position (e.g., 0% displacement along the travel path) to its fully pulled position (e.g., 100% displacement along the travel path), the signal communicated to the console by the controller 100 may gradually increase in strength (e.g., voltage) from 0% signal strength (i.e., no signal) to 100% signal strength (i.e., maximum output strength, e.g., 1 mV). The relationship between the relative degree of trigger pull and the signal output to the controller may be linear, or follow any other relationship or pattern (e.g., nonlinear, exponential, power, etc.).

The sensor 170 can be operatively coupled to the trigger 110, 112 and can detect movement of the trigger 110, 112 and generate a signal representative of such movements and communicate them to the electronics 200 (e.g., to the processor or MCU or microcontroller 175). As discussed above, the sensor 170 can be a Hall Effect sensor. However, the sensor 170 can be any type of sensor suitable for detecting movements of the trigger 110, 112 and transduce them into electrical signals representative of such movements, including but not limited to any one or more capacitive, resistive, inductive, piezoelectric, or optical sensors known in the art. For instance, the sensor 170 may include one or more of a proximity sensor, a rotation sensor, an encoder, a photoelectric sensor, a capacitive displacement sensor, an optical sensor, a strain gauge, and the like. The sensor 170 may detect trigger 110, 112 movements in any manner, directly or indirectly, including by detecting movements of one or more objects extending from or operatively coupled to the trigger 110, 112.

Signals generated by sensor 170 responsive to the movements of the trigger 110, 112 can be provided to processor 175 for processing. In some instances, the signal(s) generated by the sensor 170 undergo one or more pre-processing operations before being provided to the processor 175. The signals generated by sensor 170 and provided as input to processor 175 may be directly related the trigger's position along the travel path (which may correspond directly to how far the trigger has been pulled/pressed back by the user). Processor 175 may process the signals received from the sensor 170 according to one or more signal mapping schemes/profiles before causing the transmitter 185 (via transmitter logic and circuitry configured for either wired or wireless communication) to transmit a corresponding signal to a connected gaming console.

The signal mapping scheme may be carried out or otherwise applied in any manner, including in some instances by processor 175 executing machine-machine-readable instructions stored in memory 180 (e.g., a computer program medium) that effectuate the signal mapping scheme. The signal ultimately conveyed to the gaming console (e.g., transmitted via transmitter 185) may be directly related to how far back the trigger 110, 112, is pulled/pressed. The gaming console may receive the signal from the transmitter 185 and effectuate the gameplay functionality that corresponds to the trigger 110, 112 movement detected (e.g., the degree of trigger pull detected).

Switch 350 may be operatively coupled with processor 175 such that the state/condition of the switch 350 is known to the processor 175, and the processor 175 may process the signals generated by sensor 170 differently depending on the condition/state of the switch 350. For example, processor 175 may process the signals generated by sensor 170 in accordance with different machine-readable instructions (or in accordance with an alternative algorithm or rule nested in the same set of instructions), based on the condition/state of the switch 350.

It will be understood by one of ordinary skill in the art that processor 175 may cause a signal to be transmitted to a gaming console (or to a dongle connected thereto) in any manner, including over a wired or wireless (via transmitter 185) channel. That is, in some implementations the signals/information about movement of the trigger 110, 112 may be communicated to the gaming console via a wireless interface (e.g., a transmitter at the controller in communication with a receiver at the console), and in other implementations the signals/information about trigger movements may be may communicated to the gaming console via a wired interface (e.g., a cable).

The power source 190 of the controller 100 can enable operation of the various electronic components described above, among others. Power source 190 may be any power source. In some embodiments the power source 190 is a battery or other electrochemical cell. In other embodiments the power source 190 is provided by an AC line that may be plugged into an interface at the controller (not shown).

Figure 9:
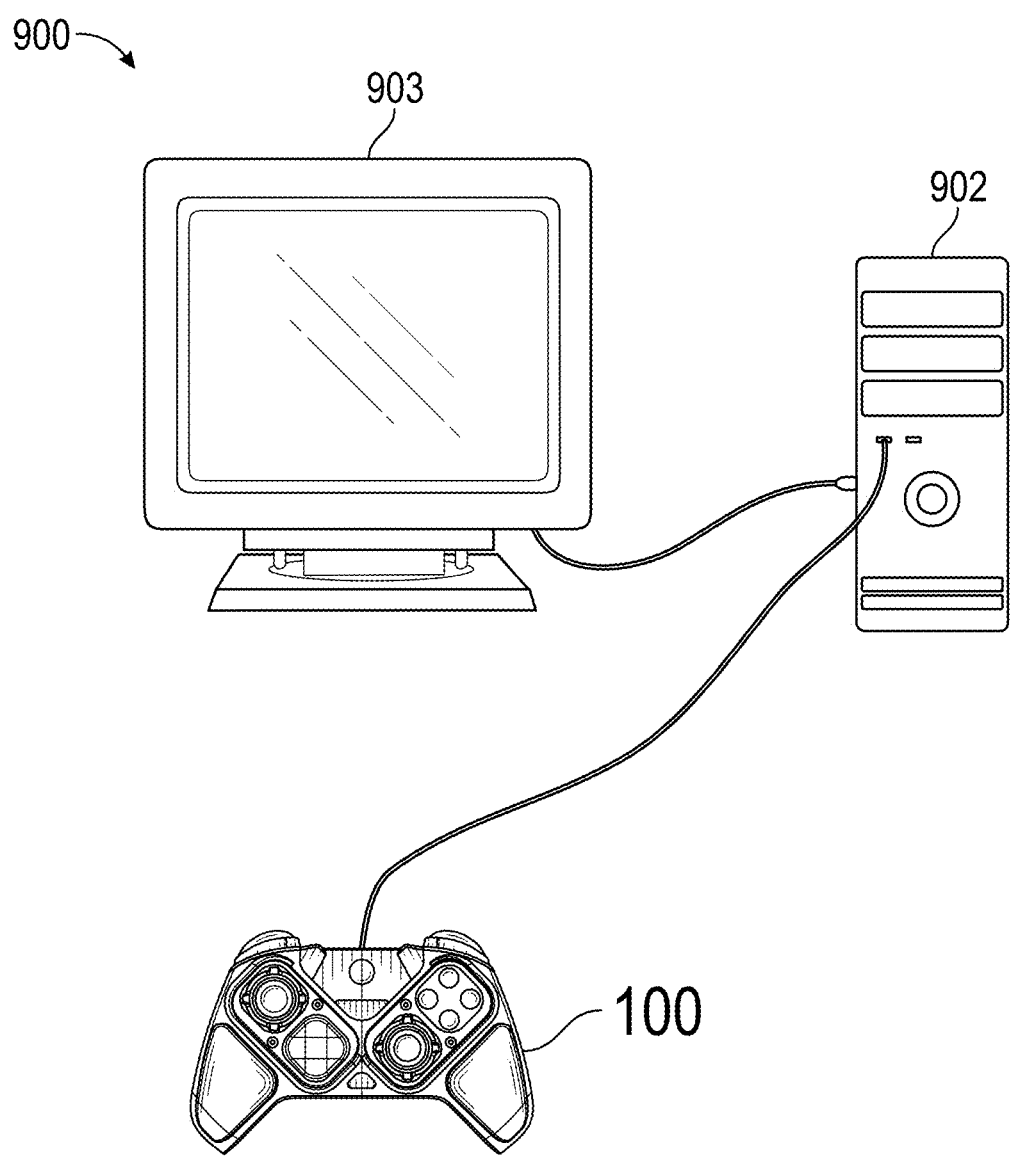
FIG. 9 illustrates a gaming system for use with the video game controller.

FIG. 9 shows a videogame system 900 that can optionally include a display 903 (e.g., an electronic display, such as a television or computer monitor), a videogame console 902, and one or more video game controllers, such as the videogame controller 100 with adjustable trigger stops described above. The videogame controller 100, the videogame console 902, and/or the display 903 can be electrically and/or mechanically coupled with one another to facilitate videogame play. The electrical circuitry included in the controller 100 may generate or alter an electrical signal based at least in part on movements of the trigger(s) 110, 112 and convey that signal to the console 902. The console 902 can process (e.g., with a computer processor) the signal it receives from the controller 100 and effectuate a gaming function or video game operation the signal is mapped to, which it can communicate to the display 903. Though FIG. 9 shows the controller 100, console 902 and display 903 coupled via wired connections (e.g., via wires), one or more of the controller 100, console 902 and display 903 can have circuitry (e.g., transmitter(s), receiver(s), transceiver(s)) that allow for wireless communication protocols to be employed between them. Moreover, in some implementations (not shown), the display 903, the console 902, and the controller 100 may all be comprised in a single device (e.g., a handheld videogaming device). Further, the controller 100, console 902 and/or display 903 can have computing modules (e.g., circuitry, electronics), discussed below in connection with FIG. 10, for implementing the operations disclosed herein.

Figure 10:
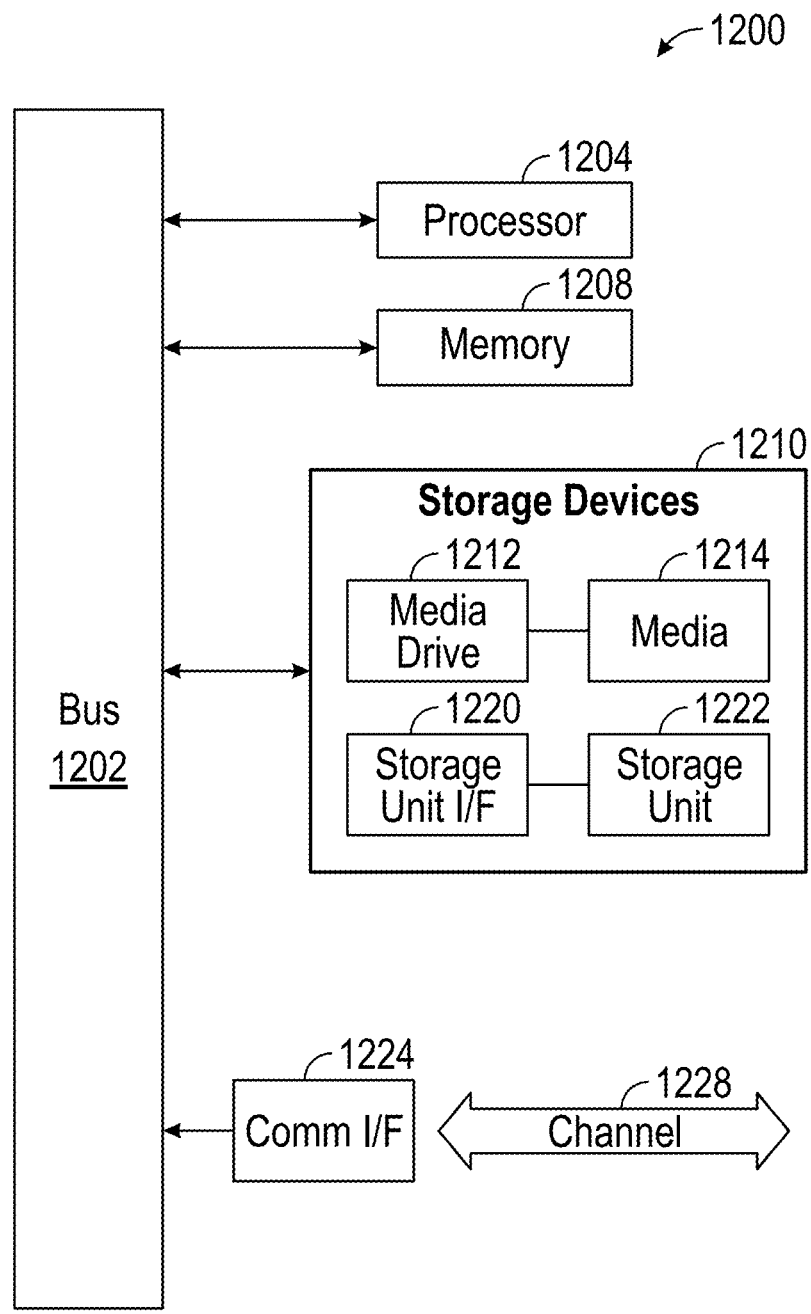
FIG. 10 illustrates a computing module that implements systems and methods for transmitting data between a remote device and a computing device.

FIG. 10 shows a computing module 1200 that may represent, for example, computing or processing capabilities found within desktop, laptop, notebook, gaming consoles, and tablet computers; hand-held computing devices (e.g., tablet computers, smart phones, etc.); wearable computing devices such as smartwatches; mainframes, supercomputers, workstations or servers; or any other type of special-purpose or general-purpose computing devices. Computing module 1200 can also represent computing capabilities embedded within or otherwise available to a given device. For instance, a computing module might be found in other electronic devices such as, for example, videogame consoles and videogaming controllers that can include some form of processing capability.

The computing module 1200 can include, for example, one or more processors (e.g., such as processor 175), controllers, control modules, or other processing devices, such as a processor 1204. Processor 1204 can be implemented using a general-purpose or special-purpose processing engine such as, for example, a microprocessor, controller, or other control logic. In the illustrated implementation, the processor 1204 is connected to a bus 1202, although any communication medium can be used to facilitate interaction with other components of the computing module 1200 or to communicate externally of the computing module 1200.

The computing module 1200 can also include one or more memory modules, simply referred to herein as memory 1208 (e.g., main memory). For example, preferably random access memory (RAM) or other dynamic memory, can be used for storing information and instructions to be executed by the processor 1204. The memory 1208 can also be used for storing temporary variables or other intermediate information during execution of instructions to be executed by the processor 1204. The computing module 1200 can likewise include a read only memory ("ROM") or other static storage device coupled to the bus 1202 for storing static information and instructions for the processor 1204.

The computing module 1200 can also include one or more information storage mechanism(s) 1210, which can include, for example, a media drive 1212 and a storage unit interface 1220. The media drive 1212 can include a drive or other mechanism to support fixed or removable storage media 1214. For example, a hard disk drive, a solid state drive, a magnetic tape drive, an optical disk drive, a CD, DVD, or Blu-ray drive (R or RW), or other removable or fixed media drive might be provided. Accordingly, the storage media 1214 might include, for example, a hard disk, a solid state drive, magnetic tape, cartridge, optical disk, a CD, DVD, Blu-ray or other fixed or removable medium that is read by, written to or accessed by the media drive 1212. The storage media 1214 can include a computer usable storage medium having stored therein computer software or data.

In other implementations, the information storage mechanism(s) 1210 can additionally or alternatively include other similar instrumentalities for allowing computer programs or other instructions or data to be loaded into computing module 1200. Such instrumentalities might include, for example, a fixed or removable storage unit 1222 and an interface 1220. Examples of such storage units 1222 and interfaces 1220 can include a program cartridge and cartridge interface, a removable memory (for example, a flash memory or other removable memory module) and memory slot, a PCMCIA slot and card, and other fixed or removable storage units 1222 and interfaces 1220 that allow software and data to be transferred from the storage unit 1222 to computing module 1200.

The computing module 1200 can also include a communications interface 1224. The communications interface 1224 can be used to allow software and data to be transferred between computing module 1200 and external devices. Examples of communications interface 1224 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via the communications interface 1224 might typically be carried on signals, which can be electronic, electromagnetic (which includes optical) or other signals capable of being exchanged by a given communications interface 1224. These signals might be provided to communications interface 1224 via a channel 1228. This channel 1228 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 1208, storage unit 1220, media 1214, and channel 1228. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1200 to perform features or functions of the present application as discussed herein.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Of course, the foregoing description is that of certain features, aspects and advantages of the present invention, to which various changes and modifications can be made without departing from the spirit and scope of the present invention. Moreover, the devices described herein need not feature all of the objects, advantages, features and aspects discussed above. Thus, for example, those of skill in the art will recognize that the invention can be embodied or carried out in a manner that achieves or optimizes one advantage or a group of advantages as taught herein without necessarily achieving other objects or advantages as may be taught or suggested herein. In addition, while a number of variations of the invention have been shown and described in detail, other modifications and methods of use, which are within the scope of this invention, will be readily apparent to those of skill in the art based upon this disclosure. It is contemplated that various combinations or subcombinations of these specific features and aspects of embodiments may be made and still fall within the scope of the invention. Accordingly, it should be understood that various features and aspects of the disclosed embodiments can be combined with or substituted for one another in order to form varying modes of the discussed devices.

What is claimed is:

1. A video game controller, comprising:
   a housing;
   a trigger movably coupled to the housing, the trigger pivotable about a first axis along a travel path in a direction transverse to the first axis from an undepressed position to a fully depressed position; and
   a trigger stop assembly comprising
      a clutch lever rotatable about a second axis, the clutch lever having a tooth that protrudes relative to a surface of the clutch lever,
      a plunger rotatable about a third axis and configured to define a travel limit of the trigger when the trigger is fully depressed and contacts at least a portion of the plunger, the plunger comprising a gear with a plurality of teeth spaced apart from each other and a clearance space between adjacent teeth configured to removably receive at least a portion of the tooth of the clutch lever therein, where the travel limit of the trigger is adjustable between a plurality of travel limit positions by inserting the tooth of the clutch lever in the clearance space between different teeth of the gear.

2. The video game controller of claim 1, wherein the plurality of travel limit positions includes a hair trigger limit position that allows a minimum travel distance for the trigger, a full travel trigger limit position that allows a maximum travel distance for the trigger, and at least one intermediate trigger limit position that allows an intermediate travel distance for the trigger that is greater than the minimum travel distance and smaller than the maximum travel distance.

3. The video game controller of claim 2, wherein the at least one intermediate trigger limit position includes three intermediate trigger limit positions.

4. The video game controller of claim 2, wherein the hair trigger limit position provides a maximum angular rotation for the trigger of 10% the maximum angular rotation for the trigger in the full travel trigger limit position.

5. The video game controller of claim 4, wherein the hair trigger limit position provides one or both of a maximum angular rotation for the trigger of 5 degrees and a maximum travel span of between 2 mm and 2.5 mm.

6. The video game controller of claim 2, wherein the plunger is biased to automatically move the plunger toward the hair trigger position upon actuation of the clutch lever.

7. The video game controller of claim 1, wherein actuation of the clutch lever causes the tooth to disengage from the gear, and where release of the clutch lever causes the tooth to engage the gear one of the plurality of travel limit positions.

8. The video game controller of claim 1, further comprising a clutch actuator attached to the clutch lever, at least a portion of the clutch actuator configured to extend through an opening in the housing, the clutch actuator selectively actuatable by a user to move the clutch lever to disengage the tooth of the clutch lever from the plunger to allow for an adjustment in the travel limit of the trigger.

9. The video game controller of claim 8, wherein the clutch actuator is a button.

10. The video game controller of claim 1, further comprising
   a processor configured to communicate an output signal to a gaming console based on movement of the trigger; and
   an electrical switch configured to communicate with the processor,
   wherein the processor is configured to map the travel span of the trigger for any of the plurality of travel limit positions to an output signal range proportionally such that the output signal communicated by the processor is the same when the trigger is fully depressed irrespective of the travel limit position set for the trigger.

11. The video game controller of claim 10, wherein the electrical switch is configured to detect the travel limit position for the trigger set by an engagement of the tooth of the clutch with the gear of the plunger, and to communicate a signal indicative of the set travel limit position to the processor.

12. The video game controller of claim 10, wherein the processor is configured to deactivate the trigger to prevent communication of the output signal to the gaming console while the clutch lever is actuated such that the tooth of the clutch lever is disengaged from the gear of the plunger.

13. A video game controller, comprising:
   a housing;
   a trigger movably coupled to the housing, the trigger pivotable about a first axis along a travel path in a direction transverse to the first axis from an undepressed position to a fully depressed position; and
   a trigger stop assembly comprising
      a clutch lever rotatable about a second axis, a clutch actuator attached to the clutch lever and configured to at least partially extend through an opening in the housing,
      a plunger rotatable about a third axis and configured to define a travel limit of the trigger when the trigger is fully depressed and contacts at least a portion of the plunger, the plunger comprising a plurality of surfaces configured to releasably engage at least a portion of the clutch lever, where the travel limit of the trigger is adjustable between a plurality of travel limit positions by releasably engaging said at least a portion of the clutch lever with a different surface of the plurality of surfaces of the plunger,
   wherein the clutch actuator is selectively actuatable by a user to disengage the clutch lever from the plunger to allow for the adjustment in the travel limit of the trigger, wherein actuation of the clutch lever causes the clutch lever to disengage from the plunger, and where release of the clutch lever causes the clutch lever to engage with the plunger in one of the plurality of travel limit positions.

14. The video game controller of claim 13, wherein the plurality of travel limit positions includes a hair trigger limit position that allows a minimum travel distance for the trigger, a full travel trigger limit position that allows a maximum travel distance for the trigger, and a plurality of intermediate trigger limit positions that allows an intermediate travel distance for the trigger that is greater than the minimum travel distance and smaller than the maximum travel distance.

15. The video game controller of claim 14, wherein the hair trigger limit position provides a maximum angular rotation for the trigger of 10% the maximum angular rotation for the trigger in the full travel trigger limit position.

16. The video game controller of claim 14, wherein the plunger is biased to automatically move the plunger toward the hair trigger position upon actuation of the clutch lever.

17. The video game controller of claim 14, further comprising
a processor configured to communicate an output signal to a gaming console based on movement of the trigger; and
an electrical switch configured to communicate with the processor,
wherein the processor is configured to map the travel span of the trigger for any of the plurality of travel limit positions to an output signal range proportionally such that the output signal communicated by the processor is the same when the trigger is fully depressed irrespective of the travel limit position set for the trigger.

18. The video game controller of claim 17, wherein the processor is configured to deactivate the trigger to prevent communication of the output signal to the gaming console while the clutch lever is disengaged from the plunger.

19. A video game controller, comprising:
a housing;
a trigger movably coupled to the housing, the trigger pivotable about a first axis along a travel path in a direction transverse to the first axis from an undepressed position to a fully depressed position; and
a trigger stop assembly comprising
a clutch lever rotatable about a second axis, the clutch lever having a pawl,
a plunger rotatable about a third axis and configured to define a travel limit of the trigger when the trigger is fully depressed and contacts at least a portion of the plunger, the plunger comprising a stepped end with a plurality of stepped surfaces spaced apart from each other, each of the stepped surfaces configured to selectively engage at least a portion of the pawl of the clutch lever, where the travel limit of the trigger is adjustable between a plurality of travel limit positions by engaging the pawl of the clutch lever with a different stepped surface of the plurality of stepped surfaces.

20. The video game controller of claim 19, wherein the plurality of travel limit positions includes a hair trigger limit position that allows a minimum travel distance for the trigger, a full travel trigger limit position that allows a maximum travel distance for the trigger, and at least one intermediate trigger limit position that allows an intermediate travel distance for the trigger that is greater than the minimum travel distance and smaller than the maximum travel distance.

* * * * *